United States Patent [19]

Banton et al.

[11] Patent Number: 5,539,866
[45] Date of Patent: Jul. 23, 1996

[54] METHOD AND APPARATUS FOR ACCURATELY RENDERING HALF-BITTED IMAGE PIXELS

[75] Inventors: Martin E. Banton, Fairport; Donna M. Charissis, Penfield, both of N.Y.

[73] Assignee: Xerox Corporation, Stamford, Conn.

[21] Appl. No.: 241,431

[22] Filed: May 11, 1994

[51] Int. Cl.$^6$ .................................................. G06K 15/00
[52] U.S. Cl. ........................................ 395/117; 395/112
[58] Field of Search .................................. 395/128, 100, 395/109, 117, 132, 112

[56] References Cited

U.S. PATENT DOCUMENTS

| | | | |
|---|---|---|---|
| 4,437,122 | 3/1984 | Walsh et al. | 358/166 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 4,974,171 | 11/1990 | Yeh et al. | 364/519 |
| 5,125,072 | 6/1992 | Ng | 395/112 |
| 5,150,311 | 9/1992 | Long et al. | 395/108 |
| 5,155,478 | 10/1992 | Sekiya et al. | 340/793 |
| 5,161,035 | 11/1992 | Muramatsu | 358/451 |
| 5,161,213 | 11/1992 | Knowlton | 395/128 |
| 5,191,640 | 3/1993 | Plass | 395/100 |
| 5,193,008 | 3/1993 | Frazier et al. | 358/298 |
| 5,206,741 | 4/1993 | Shimura et al. | 358/404 |
| 5,216,753 | 6/1993 | Ng | 395/109 |
| 5,271,095 | 12/1993 | Yamada | 395/128 |
| 5,276,787 | 1/1994 | Searby | 395/132 |

OTHER PUBLICATIONS

*Mathematical Morphology in Image Processing*, pp. 43–90 (Edward R. Dougherty ed., Marcel Dekker 1992).

Robert P. Loce et al., *Optimal Morphological Restoration: The Morphological Filter Mean–Absolute–Error Theorem*, Journal of Visual Communications and Image Representation, (Academic Press), vol. 3, No. 4, Dec. 1992, pp. 412–432.

Edward R. Dougherty et al., *Optimal mean–absolute–error hit–or–miss filters: morphological representation and estimation of the binary conditional expectation*, Optical Engineering, vol. 32, No. 4, Apr. 1993, pp. 815–827.

*Primary Examiner*—Raymond J. Bayerl
*Assistant Examiner*—Steven P. Sax
*Attorney, Agent, or Firm*—Duane C. Basch

[57] ABSTRACT

A method and apparatus for identifying regions within a first binary image where half-bitting may be present, converting those regions to a multiple-bit/pixel representation so as to accurately represent the image density and the intended edge structure for the region, and further generating an enhanced resolution representation of the region in either a second binary image, wherein the second binary image has a spatial resolution greater than the first image, or a multiple-bit per pixel (gray) image at the same resolution as the input image so as to enable an improved rendering of the first binary image.

17 Claims, 10 Drawing Sheets

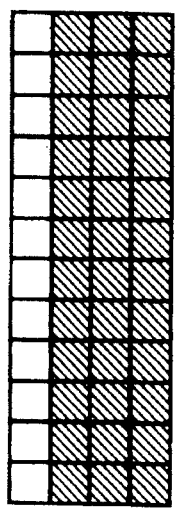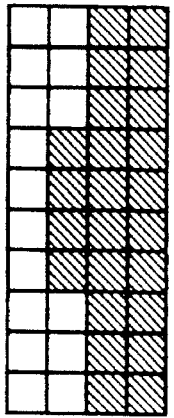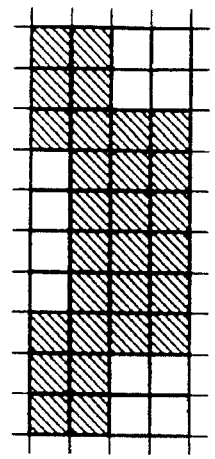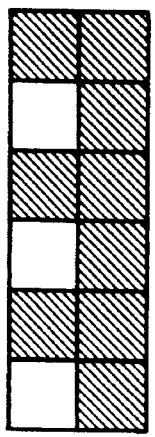
FIG. 7A  FIG. 7B  FIG. 7C

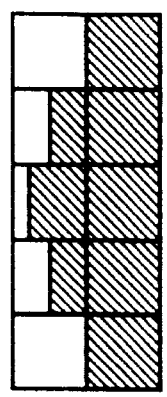
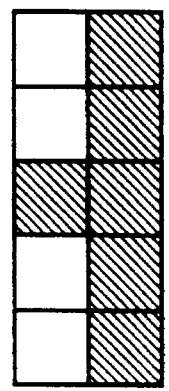
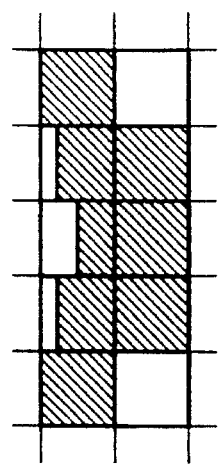
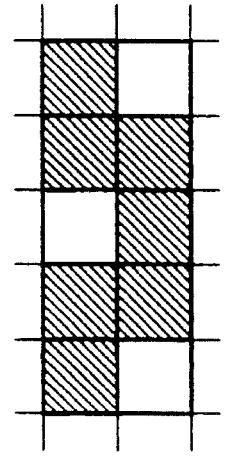
FIG. 8C
FIG. 8D

METHOD AND APPARATUS FOR ACCURATELY RENDERING HALF-BITTED IMAGE PIXELS

This invention relates generally to a method and apparatus for improving the appearance of binary images that may include half-bitted regions therein, and more particularly to identifying regions of a first binary image where it is desirable to smooth jagged or curved edges and where half-bitting may be present, converting the regions to a multiple-bit per pixel representation, and generating an enhanced resolution representation of the region.

CROSS REFERENCE

The following related applications are hereby incorporated by reference for their teachings:

"Method for Design and Implementation of an Image Resolution Enhancement System that Employs Statistically Generated Look-Up Tables," Loce et al., Ser. No. 08/169,485, filed Dec. 17, 1983;

"Non-integer Image Resolution Conversion Using Statistically Generated Look-up Tables," Loce et al., Ser. No. 08/170,082, filed Dec. 17, 1993;

"Method for Statistical Generation of Density Preserving Templates for Print Enhancement," Loce, Ser. No. 08/169,565, filed Dec. 17, 1993;

"Image Resolution Conversion Method that Employs Statistically Generated Multiple Morphological Filters," Loce et al., Ser. No. 08/169,487, filed Dec. 17, 1993; and "Automated Template Design for Print Enhancement," Eschbach, Ser. No. 08/169,483, filed Dec. 17, 1993.

BACKGROUND AND SUMMARY OF THE INVENTION

Information systems for handling numerous document and data formats are quickly becoming open systems where different devices are tied to one another to provide solutions to customers' needs. A key feature in such open systems is enabling electronic documents to be printed on a range of output devices. In order to achieve device-independence, efficient methods of image enhancement are required. Hence, raster conversion technology, where a bitmap created for a first output device, for example a bitmap containing half-bitting, is altered so as to be adequately rendered by a second output device, has become an important aspect of the open system technology.

Distortion in bitmap images rendered by digital printing techniques is a consequence of the low resolution of the bitmap or the low sampling rates of the analog image that is intended to be represented. In the past, limitations on the capabilities of xerographic printing systems, for example the low modulation transfer function (MTF) of such systems, reduced the distortion to an acceptable level. At the same time, the approach commonly employed to reduce distortion was to increase the spatial resolution of the bitmap image and use half-bitting techniques, so as to adequately render the detail lost at lower resolutions. Unfortunately, with improved imaging and development processes, xerographic printing systems now render half-bitted and jaggy images with such clarity as to be objectionable to persons demanding high quality printed output. Thus, the half-bitting techniques that once enabled the reasonable rendition of a low resolution image or character font are now a detriment to accurately reproducing the finest detail of the analog image across a range of printers. The present invention enables device-independent printing by using image processing to enhance binary input images having a first resolution so as to produce images having a second resolution; either binary images with a spatial resolution greater that the first resolution, or multiple-bit per pixel images at the first resolution, so that the distortions within the input image are reduced or eliminated upon printing.

Heretofore, resolution enhancement has been accomplished using various techniques, including those described in the following disclosures which may be relevant:

U.S. Pat. No. 4,544,264 (issued Oct. 1, 1985) and U.S. Pat. No. 4,625,222 (issued Nov. 26, 1986), both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,544,922 to Watanabe et al., issued Oct. 1, 1985, teaches a smoothing circuit for an orthogonal matrix display. The circuit adds or removes a "small dot" on the display from either the first or last third of a dot clock (DCK) period that is one-third the period in which a standard dot of the original pattern is displayed.

U.S. Pat. No. 4,933,689 to Yoknis, issued Jun. 12, 1990, describes a method for enhancing a displayed image in a laser exposed dot matrix format to produce softened edge contours using three pulses, a central pulse plus leading and trailing enhancement pulses that are separated therefrom. The purpose of the leading and trailing pulses is to create a blurred or grayed region at the leading and trailing edges of each associated character.

U.S. Pat. No. 5,150,311 to Long et al., issued Sep. 22, 1992, discloses a system for producing print-dot data suitable for driving a hardcopy printing device. More specifically, the print-dot data is selectively obtained from a conversion operation carried out by a matrix and dot generator combination which respectively generate subtractive color components and a pattern of high resolution print-dots therefrom.

U.S. Pat. No. 5,161,035 to Muramatsu, issued Nov. 3, 1992, teaches an image processing device for enlarging an original bitmap image, where the image density distribution is maintained.

U.S. Pat. No. 5,193,008 to Frazier et al., issued Mar. 9, 1993, further describes the resolution enhancement apparatus as one that includes the ability to rasterize the image to be printed at twice the resolution of the printer. The printer then outputs the higher resolution image using an interleaving technique that generates developable dots between scan lines by energizing corresponding dots on adjacent scan lines at a level which will not be developed, but where the overlapping portion of the two corresponding dots will be developable.

U.S. Pat. No. 5,206,741 to Shimura et al., issued Apr. 27, 1993, discloses an image processing apparatus for processing image data to be output by a printing unit. A conversion unit converts pixel image data within an image memory into data having a resolution equal to the output resolution of the print mechanism.

A number of the previously described patents and publications are summarized in Torrey Pines Research, *Behind Hewlett-Packard's Patent on Resolution Enhancement*™ *Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

L. Steidel in *Technology Overview: Resolution Enhancement Technologies for Laser Printers*, LaserMaster Corp., discusses three currently available implementations for vertical resolution enhancement; Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser laser energy from a brief laser flash, which leaves only residual or fringe energy on the image drum at the periphery of a pixel of an adjacent pixel on a second scan line.

Of particular importance are the following patents and publications:

U.S. Pat. No. 4,437,122 to Walsh et al., issued Mar. 13, 1984, teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,841,375 to Nakajima et al., issued Jun. 20, 1989, discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/ output (I/O) and the conversion operations.

U.S. Pat. No. 4,847,641 (issued Jul. 11, 1989) and U.S. Pat. No. 5,005,139 (issued Apr. 2, 1991) to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. patent application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

*Mathematical Morphology in Image Processing*, pp. 43–90 (Edward R. Dougherty ed., Marcel Dekker 1992), hereby incorporated by reference, describes efficient design strategies for an optimal binary digital morphological filter. A suboptimal design methodology is investigated for binary filters in order to facilitate a computationally manageable design.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit- or-miss filters: morphological representation and estimation of the binary conditional expectation*, Optical Engineering, Vol. 32, No. 4, April 1993, pp. 815–827, incorporated herein by reference, disclose the use of a hit-or-miss operator as a building block for optimal binary restoration filters. Filter design methodologies are given for general-, maximum-, and minimum-noise environments and for iterative filters.

It is an object of the present invention to improve the appearance of binary images that may contain half-bitted regions therein, and more particularly to identify regions of a first binary image where it is desirable to smooth jagged or curved edges or where half-bitting is present, converting those regions to a multiple-bit per pixel representation, and generating an enhanced multiple-bit per pixel representation of the region in a second image having the same resolution as the first image or in a second binary image with a resolution greater than the first image so as to enable an improved rendering of the first binary image by printing of the second image.

In accordance with the present invention, there is provided a method for increasing the resolution of a binary input image to be printed by an electronic printing system, comprising the steps of: storing a portion of the binary input image in a scanline buffer memory; selecting a central pixel within the binary input image; determining the binary state of the central pixel and of a plurality of pixels neighboring the central pixel; comparing the binary pixel states of the central pixel and the neighboring pixels to associated pixel states in a predefined template; detecting when a match occurs between the central and neighboring pixel states and the predefined template; defining, upon detection of a match, a multi-bit digital signal as a value associated with the predefined template identified by the match; and converting the multi-bit digital signal into a resolution enhanced output pixel suitable for printing by the electronic printing system.

In accordance with another aspect of the present invention, there is provided a method for improving the appearance of a binary input image to be printed by an electronic printing system, the binary input image containing a half-bitted region therein, comprising the steps of: storing a portion of the binary input image in scanline buffer memory; identifying the region of half-bitted image pixels within the binary input image; generating a plurality of multi-bit digital signals to represent image pixels within half-bitted region; and converting each multi-bit digital signal into a resolution enhanced output pixel suitable for printing by the electronic printing system.

In accordance with yet another aspect of the present invention, there is provided an apparatus for increasing the resolution of a binary input image to be printed by an electronic printing system, including: scanline buffer memory for storing a portion of the binary input image; target pixel selection means, operating on the stored portion of the binary input image, for selecting a central pixel within the binary input image; template matching means for comparing the binary pixel state of the central pixel and a plurality of pixels neighboring the central pixel to a predetermined template pattern so as to determine a multi-bit digital signal which represents a desired output density for the central pixel; and a video signal generator for converting the multi-bit digital signal into at least one output pixel suitable for printing by the electronic printing system.

BRIEF DESCRIPTION OF THE DRAWINGS

FIGS. 7A–7E are examples of image sections at various stages of processing in accordance with the present invention; and FIGS. 8A–8D are examples of image sections at various stages of processing in accordance with another aspect of the present invention wherein the right-most portions thereof indicate the effect on the output paper.

Figure 1:
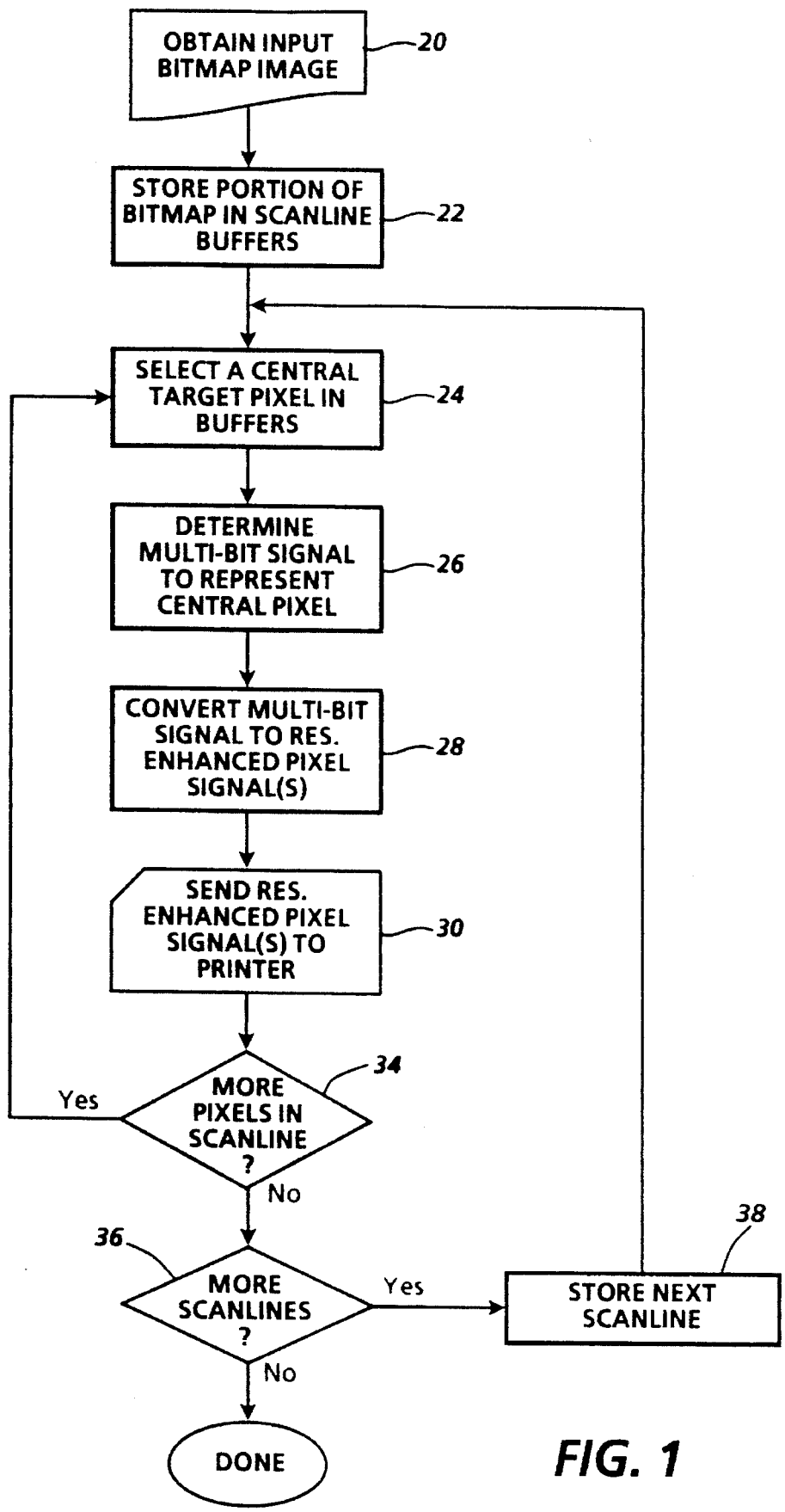
FIG. 1 is a flowchart illustrating the general operations of the instant invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of aspects of the present invention, reference is made to the drawings. In the drawings, like reference numerals have been used throughout to designate identical elements. As used herein, the terms video signal and image signal are intended to describe any form of digital signal used to represent a pixel (picture element) within a bitmap image, be it for display, printing, or transmission thereof.

Figure 2:
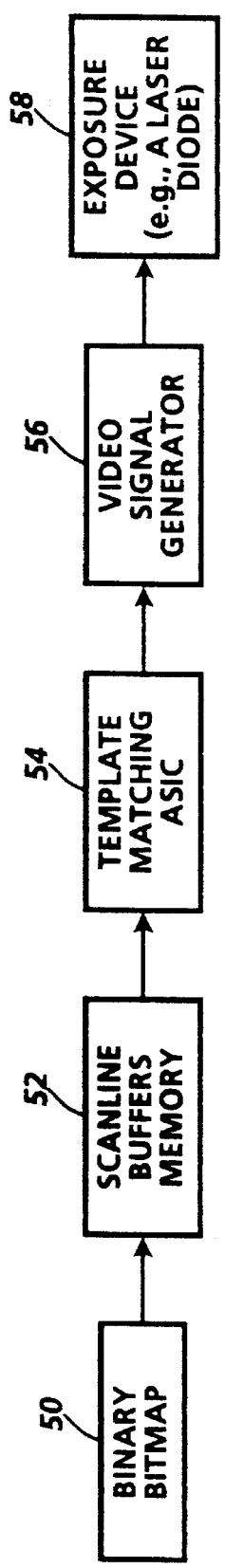
FIG. 2 is a block diagram of the hardware elements of an embodiment used to carry out the operations of FIG. 1.

FIG. 1, in conjunction with FIG. 2, illustrates the process steps used in carrying out the instant invention. Initially, at step 20, a binary image bitmap 50 is identified for resolution enhancement. The image is a binary image that may be generated from any of a number of sources, including digitizing a hardcopy document, computer generated documents, etc. The input document will be characterized hereafter as having a first resolution. Subsequently, a portion of the input document is stored in a memory comprising a series of scanline buffers 52, step 22. This step is equivalent to "windowing" or selecting a portion of the input image data for examination, where a series of successive scanlines of data, or possibly partial scanlines, are copied or moved to scanline buffers. When the successive scanlines are stored within the scanline buffers a target pixel at or near the center of the stored region is selected for processing, step 24.

Once the central target pixel has been selected, the hardware of template matching application specific integrated circuit (ASIC) 54 is employed to determine a multi-bit digital signal representative of the central target pixel. ASIC 54 uses template matching techniques described hereafter to analyze the binary state of the target and neighboring pixels within the scanline buffers to determine the multi-bit signal. Once determined, the multi-bit signal is converted to at least one resolution enhanced signal at step 28 via the operation of video signal generator 56. As will be described, the resolution enhanced pixel signals produced by the video signal generator may be a multiple-bit or gray-scale output signal, or alternatively a plurality of binary output signals. Once converted, the enhanced pixel signals are passed to an exposure device 58, such as a digital printer, suitable for receiving, and/or temporarily storing the enhanced pixel signals for subsequent output thereof, step 30. As an example, one such device could be the pulse-width position modulated (PWPM) exposure device described in U.S. application Ser. No. 08/118,858 by Cianciosi et al. for "Apparatus for Enhancing Pixel Addressability in a Pulse Width and Position Modulated System,", filed Sep. 8, 1993, the teachings thereof being hereby incorporated by reference. In yet another alternative embodiment, the present invention may be incorporated within a multi-color or highlight color printing system to improve the rendition of output images produced thereon. In such a case, an arbitration circuit, such as disclosed by Cianciosi et al. in U.S. application Ser. No. 08/118,923 for "Method and Apparatus for Enhancing Discharged Area Developed Regions in a Tri-level Printing System", filed Sep. 8, 1993, may be employed to select from the enhanced resolution black or highlight color output pixels. As illustrated by steps 34, 36, and 38, the process repeats for each pixel within a scanline and for each scanline within the input image, given an allowance for a lack of image context around the edges of the image, so as to process the entire image in the same manner.

Figure 3:
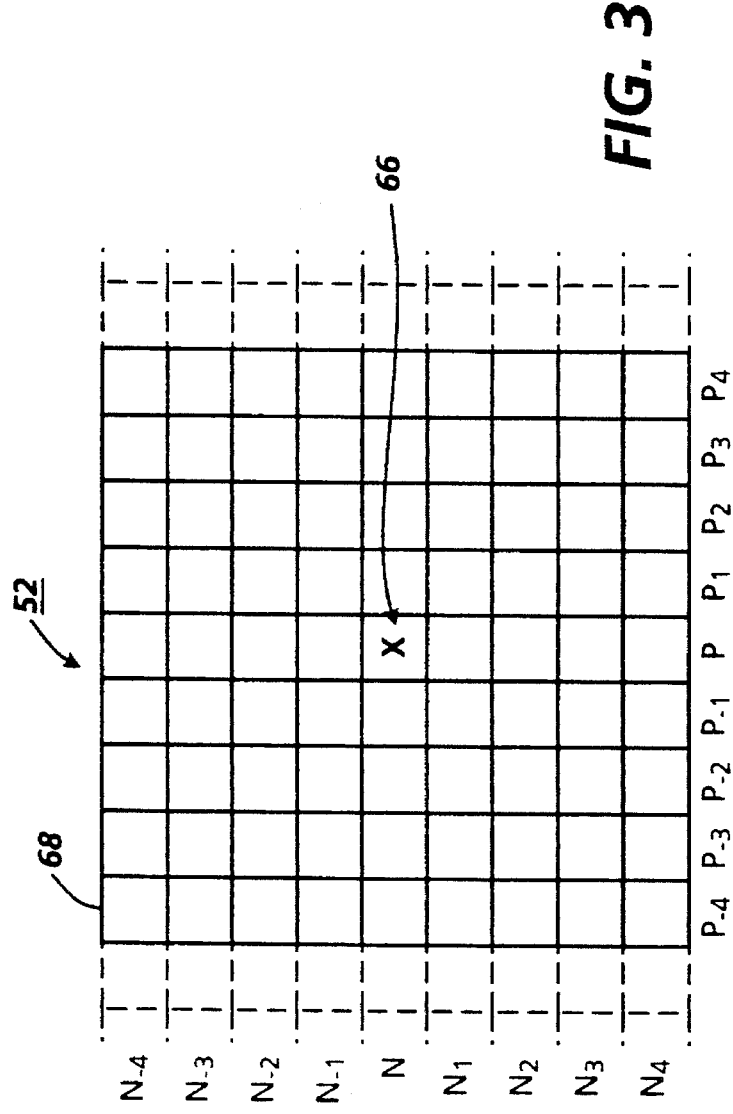
FIG. 3 is an illustration of a portion of the scanline buffers depicted in FIG. 2.
Figure 4:
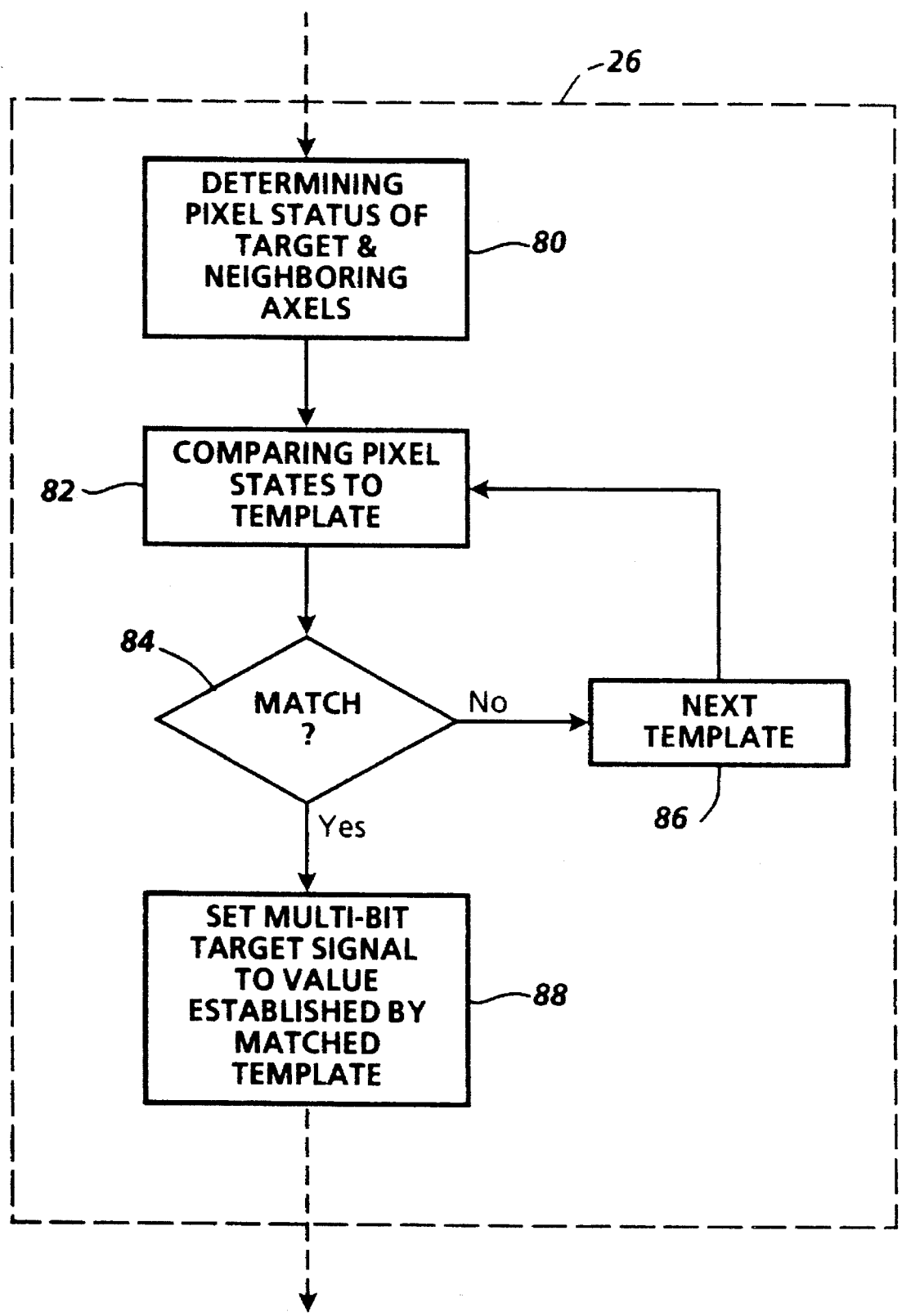
FIG. 4 is a detailed flowchart illustrating the specific steps associated with the multi-bit signal determining step of FIG. 1.

Having generally described the operation of the present invention, attention is now turned to various aspects thereof which will be described in further detail. Referring for example to FIG. 3, which illustrates one embodiment of the scanline buffers, the illustrated embodiment utilizes a series of nine scanlines ($N_{-4}, \ldots, N, \ldots, N_4$), each capable of storing at least nine pixels ($P_{-4}, \ldots, P, \ldots, P_4$) therein. As illustrated, a central target pixel X, indicated by reference numeral 66 is selected from the center of "window" 68. The binary states of target pixel X, and one or more additional pixels within window 68, are then compared to a plurality of equally sized templates, an example of which is illustrated in FIG. 5B. As shown in FIG. 4, which further illustrates the steps included within determining step 26, the binary states of the individual pixels within window 68 are determined, step 80, and subsequently compared to the pixel states required by one of the templates implemented via ASIC 54.

Figure 5A:
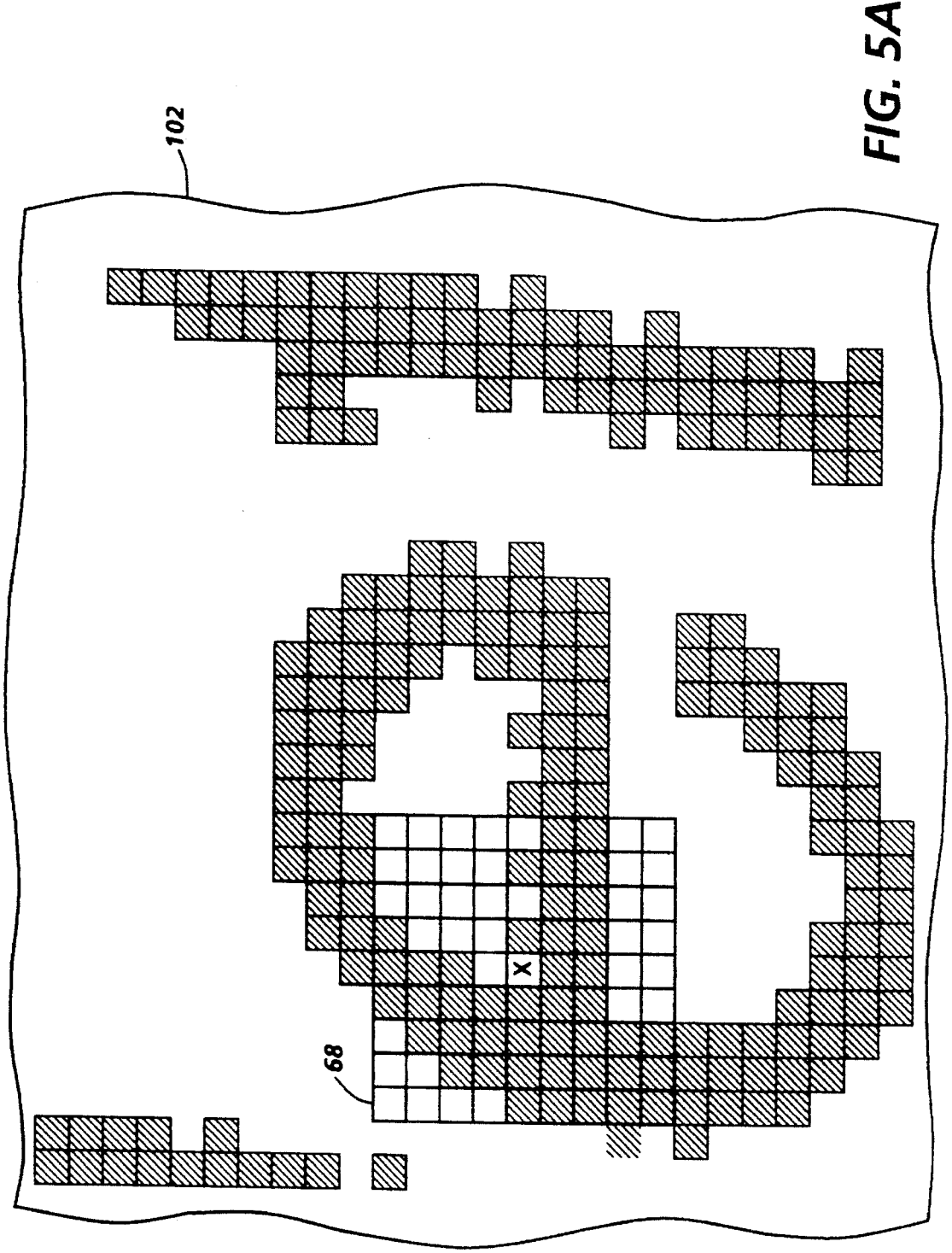
FIGS. 5A and 5B, respectively, illustrate an example bitmap image segment and a template matching a portion thereof.
Figure 5B:
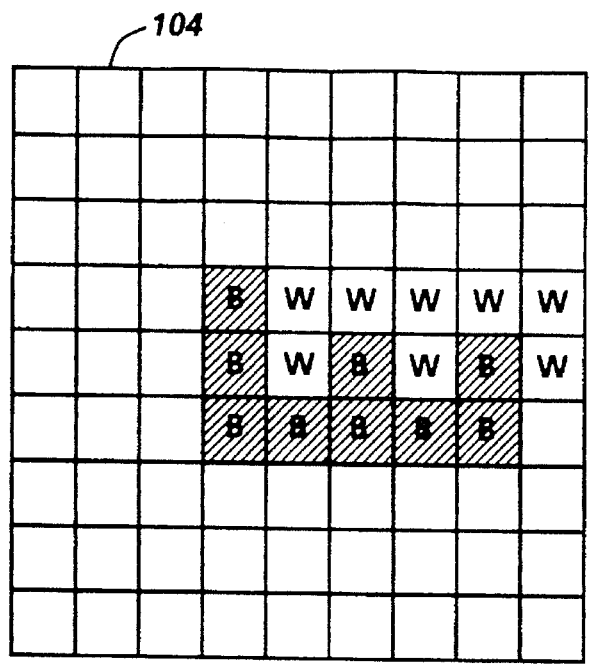
Figure 5C:
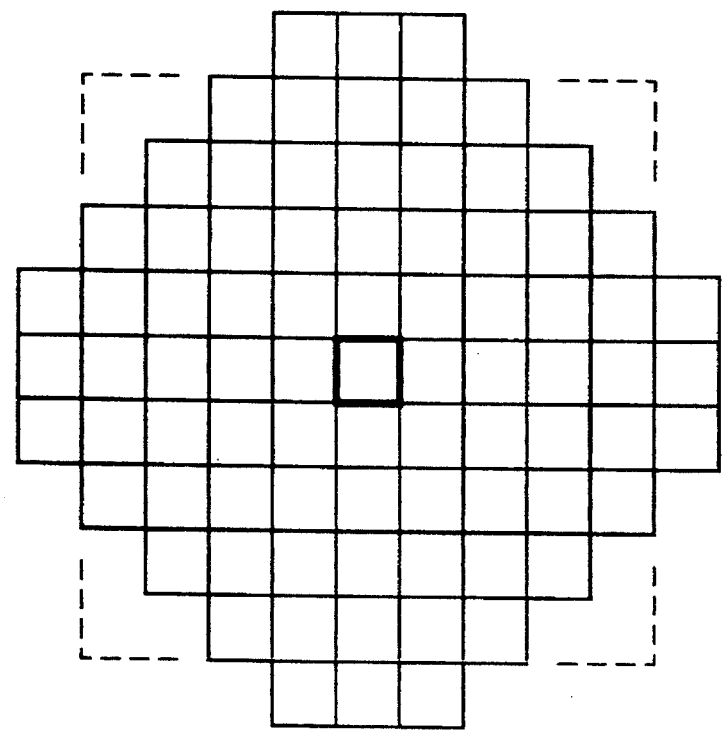
FIG. 5C shows an alternate embodiment of the sampling window where a restricted region of an 11×11 square window may be used.

An example of such a comparison is shown in FIGS. 5A and 5B. FIG. 5A illustrates a portion of a binary image 102, having both black and white pixels therein, and a 9 pixel by 9 scanline window 68 superimposed thereon. As illustrated in FIG. 5A, window 68 is intended to represent a portion of image 102 as would be stored in scanline buffers 52 as previously described. FIG. 5B illustrates the detail of a template 104 that would be identified as a match when compared against the binary image signals within window 68. More specifically, as shown in FIG. 5B, the template contains pixel positions requiring a black pixel for a match (B), pixel positions requiring a white pixel for a match (W), and pixel positions where either black or white may be present for a match (blank). In an alternative embodiment a restricted 11×11 template may be used in place of the 9×9 square template. The outline for such a template is illustrated in FIG. 5C, where it can be seen that the alternative shape employs the same number of elements as the 9×9 template of FIG. 5B while providing for improved smoothing of features parallel and perpendicular to the scanning laser beam, i.e., for nearly horizontal or nearly vertical features.

As is apparent from a comparison of template 104 to the windowed region of image 102, a match is present for the pixel position indicated by X. Accordingly, step 84 of FIG. 4 would indicate an affirmative response upon such a comparison and would generate a multi-bit signal representing the intended value or gray-scale image density of target pixel X, step 88. If no match were found after comparison at step 82, a multi-bit value indicative of an all white or all black pixel to be imaged is assigned to the central pixel, and the determination process would continue at step 86 where another template would be selected for comparison against the binary signals within the scanline buffers.

In a preferred embodiment, the ASIC implementation of the template comparison step allows the concurrent comparison of the binary pixel states within the scanline buffers to the identified templates, the output of which is the multi-bit signal representing an enhanced value for the target pixel. It should be noted that the operation of ASIC 54 may be optimized so as to improve the processing speed thereof. In addition, commonality between various templates may be exploited to more efficiently group the templates for processing, thereby resulting in a reduced size ASIC as well as improved speed.

In one embodiment, the template set needed to identify half-bitted and/or jaggy regions within a binary bitmap image may be generated using the process described by Eschbach in U.S. application Ser. No. 08/169,483, "Automated Template Design for Print Enhancement" or by Loce et al. in U.S. application Ser. No. 08/169,565, "Method for Statistical Generation of Density Preserving Templates for Print Enhancement," both of which have been previously incorporated herein by reference for their teachings. More specifically, using the template design process, a series of input documents having half-bitted and jaggy regions therein would be included in the set of training documents so as to cause the generation of templates for the recognition of such regions. In a preferred embodiment, the template set designed will be symmetric with respect to short- and long-edge printing devices; meaning that the template set is preferably designed to recognize similar patterns in the input bitmap image regardless of whether the image is to be rendered in a short- or long-edge oriented output process. Hence, the template window 68 is preferably a symmetric window, whether it is the square illustrated in FIG. 3, or the modified window represented in FIG. 5C.

Figure 6:
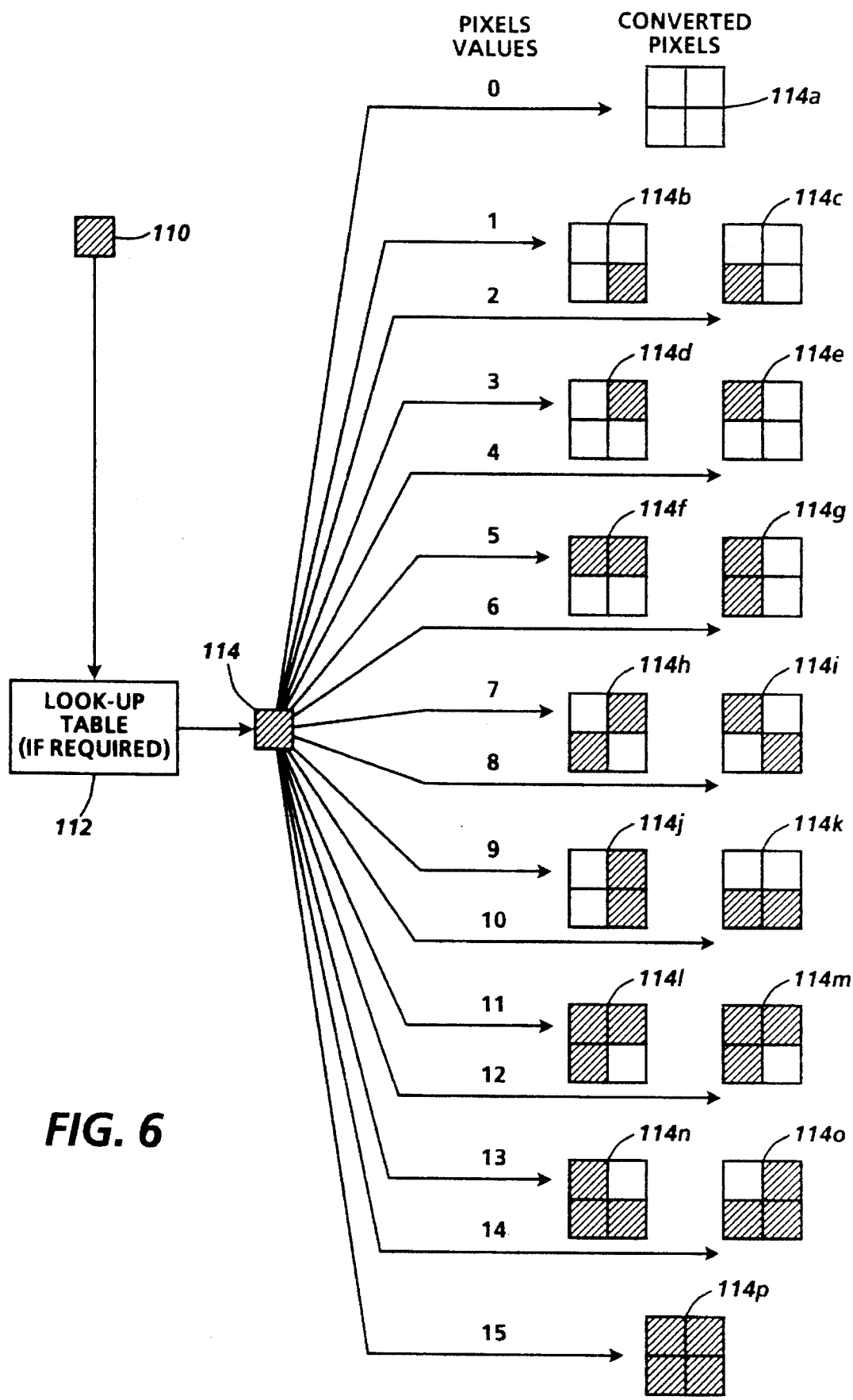
FIG. 6 is a schematic illustration of the operation of the video signal generator of FIG. 2 in accordance with the conversion step of FIG. 1.
Figure 7D:
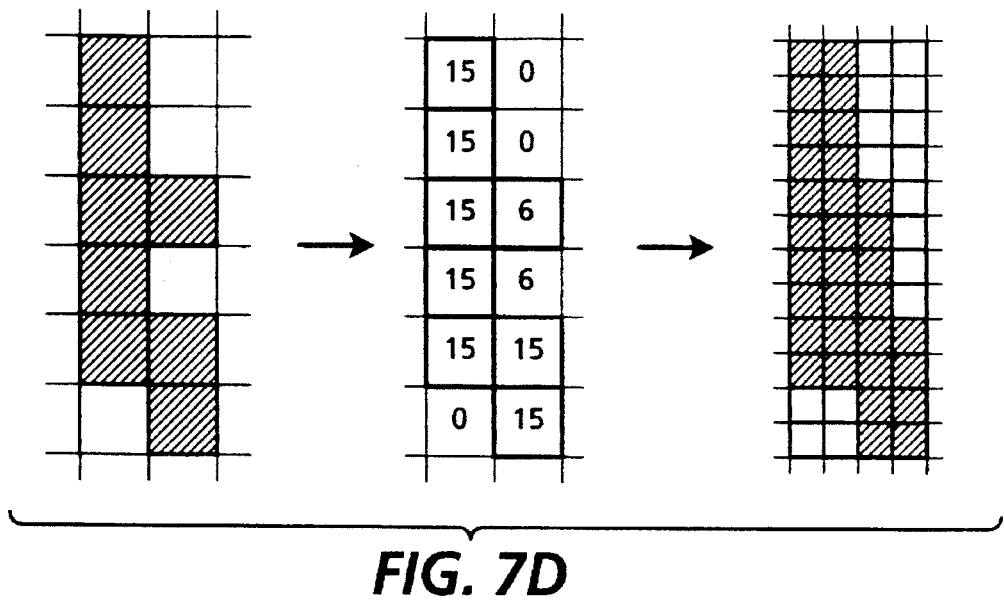
Figure 7E:
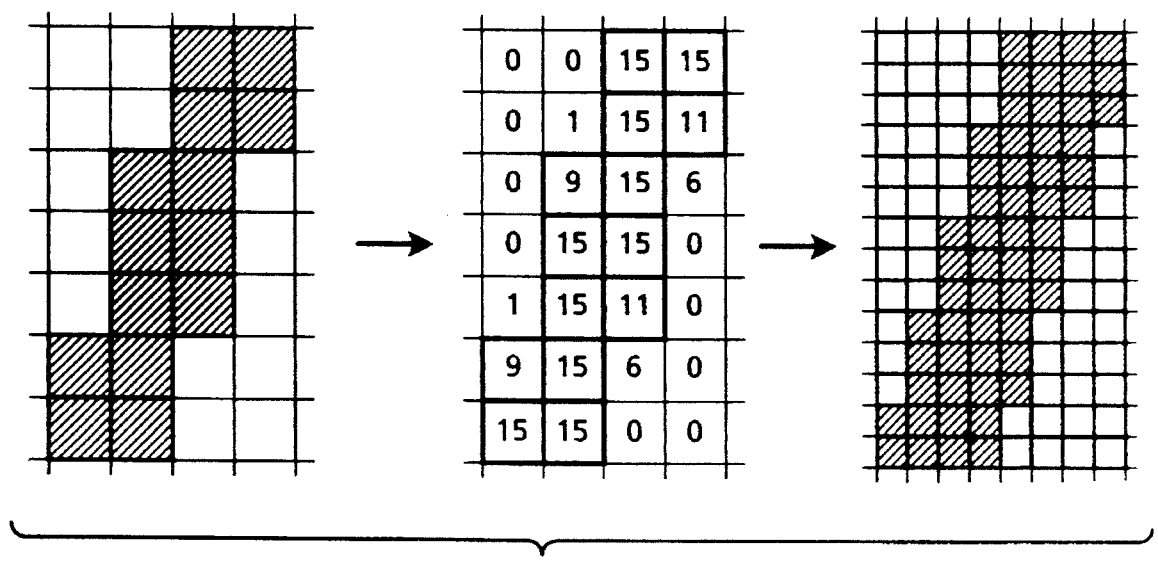
Figure 8A:
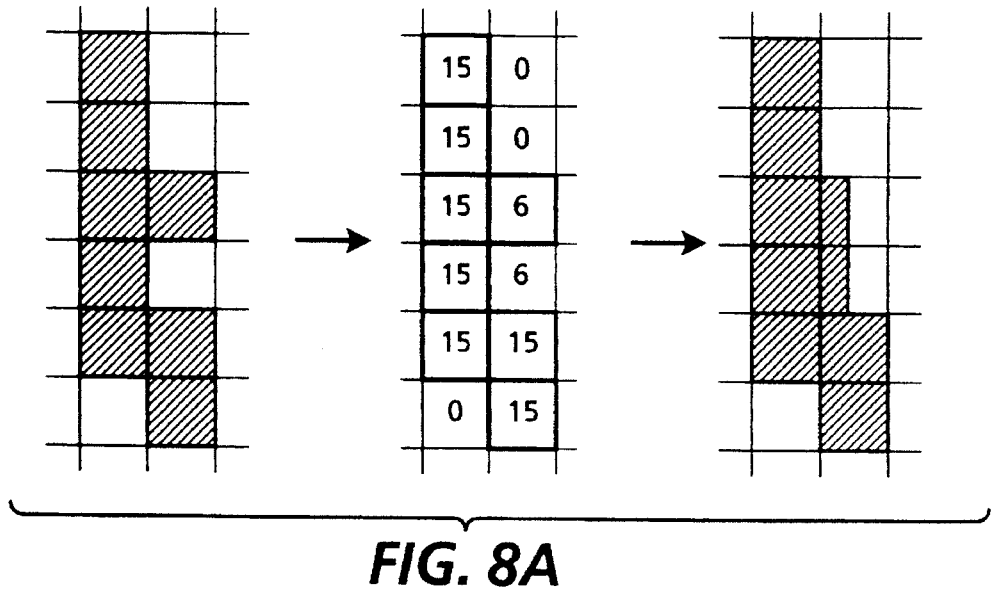
Figure 8B:
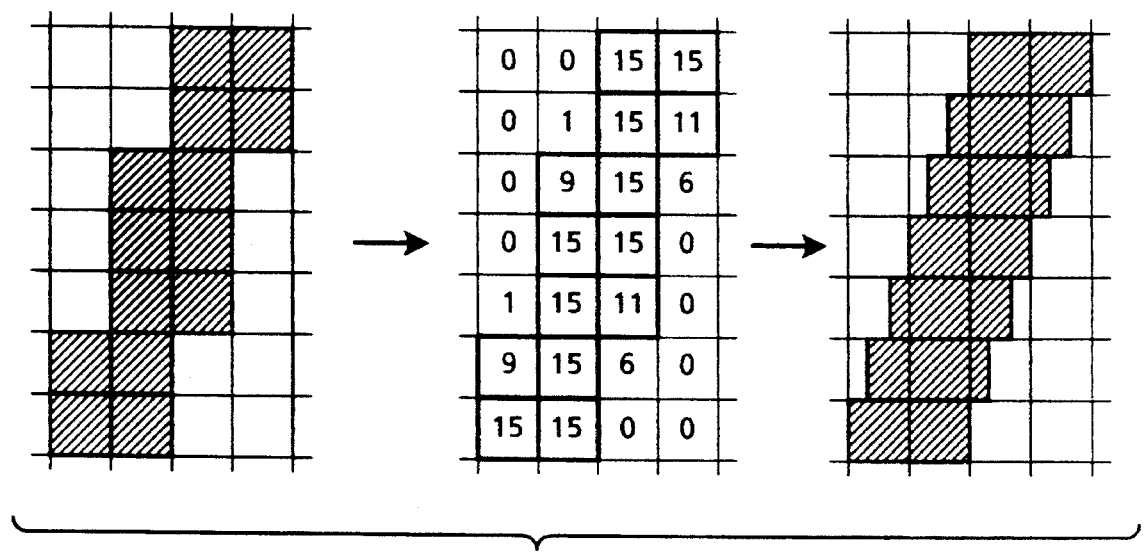

Once a multi-bit or enhanced signal is determined, the signal itself, being equivalent to a gray-scale pixel signal, may be output by a printing or display device suitable for printing gray-scale images. Alternatively, as represented by step 28 of FIG. 1 and block 56 of FIG. 2, the enhanced pixel is converted into a plurality of pixels having a higher spatial resolution than the input binary image. As illustrated pictorially by FIG. 6, enhanced, multi-bit image signal 110 is passed to look-up table (LUT) 112, where one of a set of higher spatial resolution pixel combinations may be generated ($114a$–$114p$), depending upon the pixel value output by the LUT. In addition, LUT 112 may be software downloadable to enable customization of the enhancement process.

To further illustrate the aforedescribed process, FIGS. 7A through 7E are provided. In each of the figures, the left-most representation is intended to illustrate a portion of a binary image bitmap, specifically the black pixels therein (shown with cross-hatching). The middle representation of each figure set shows the various multi-bit, enhanced signal levels assigned to the individual pixels as a result of processing the binary input image in accordance with the present invention. To accurately reproduce the input image on a binary printer capable of operating at a higher spatial resolution, the enhanced image signals would be converted to one of the binary pixel sets illustrated in FIG. 6; as represented by the right-most bitmaps which are depicted as having a spatial resolution twice that of the left-most input bitmaps.

Similarly, FIGS. 8A through 8D are provided to further illustrate the process for a multi-bit per pixel or gray scale embodiment. In each of the figures, the left-most representation is again intended to illustrate a portion of a binary image bitmap, where the black pixels are shown as crosshatched. The middle representation of each figure set shows the various multi-bit, enhanced signal levels assigned to the individual pixels as a result of processing the binary input image in accordance with the present invention. Lastly, the right-most representations in FIGS. 8A through 8D depict representative gray-scale or multi-bit output as it would appear on the output medium at the same spatial resolution as the binary image bitmap. In such a situation, the output device might produce a variable width exposure pulse or a variable exposure amplitude to expose each pixel in accordance with the level of the enhanced signal, as shown in the right-most image representations by the partially crosshatched pixels. More specifically, variable exposure in response to the multi-bit enhanced output may be achieved by various methods, including: pulse-width modulation;

amplitude modulation; or a combination of pulse-width and amplitude modulation. The output signal used to drive pulse-width or amplitude modulated output devices may be generated by various methods, and could include the use of a look-up table to further reduce range of the multi-bit output to a range matching that of the specific output device employed in a fashion similar to that illustrated in FIG. 6 for the binary output situation.

In recapitulation, the present invention is a method and apparatus for identifying regions within a first binary image where image patterns, often in the form of half-bitting, may be present, converting at least those regions to a multiple-bit per pixel representation so as to accurately represent the image density desired for the region, and further generating an enhanced resolution representation of the region in a second binary image, wherein the second binary image has a spatial resolution greater than the first image, so as to enable an improved rendering of the first binary image. Alternatively, instead of generating the second higher resolution binary output, the multiple-bit per pixel representation may be used to drive the output of a pulse-width or amplitude modulated marking device.

It is, therefore, apparent that there has been provided, in accordance with the present invention, a method and apparatus for improving the appearance of binary images having half-bitted regions therein. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for accurately rendering half-bitted pixels upon increasing the resolution of a binary input image to be printed by an electronic printing system, comprising the steps of:

storing a portion of the binary input image in a scanline buffer memory;

selecting a central pixel within the binary input image;

determining the binary state of the central pixel and of a plurality of pixels neighboring the central pixel;

comparing the binary pixel states of the central pixel and the neighboring pixels to associated pixel states in a predefined template;

detecting when a match occurs between the central and neighboring pixel states and the predefined template to identify an occurrence of a half-bitted central pixel;

defining, upon detection of a match, a multi-bit digital signal as a value uniquely associated with the predefined template identified by the match; and converting the multi-bit digital signal into a resolution enhanced output pixel suitable for printing by the electronic printing system wherein the resolution enhanced output pixel will not result in a half-bitted output when printed by the electronic printing system.

2. The method of claim 1, wherein the step of converting the multi-bit digital signal into a resolution enhanced output pixel includes the step of converting the multi-bit digital signal into a plurality of binary output pixels.

3. The method of claim 2, wherein the step of converting the multi-bit digital signal into the plurality of binary output pixels includes the steps of:

utilizing the multi-bit digital signal as an index value to a look-up table; and using the look-up table, generating a plurality of binary output pixels, in response to the index value, wherein the binary output pixels are at a resolution greater than the resolution of the binary input image yet suitable for printing by the electronic printing system.

4. The method of claim 3, further including the step of downloading, to the look-up table, the binary output pixels to be stored in the look-up table.

5. The method of claim 1, wherein the step of converting the multi-bit digital signal into a resolution enhanced output pixel includes the step of converting the multi-bit digital signal into a multi-bit output signal having fewer bits than the multi-bit digital signal.

6. The method of claim 5, wherein the step of converting the multi-bit digital signal into the multi-bit output signal includes the steps of:

utilizing the multi-bit digital signal as an index value to a look-up table; and using the look-up table, generating the multi-bit output signal, in response to the index value, wherein the output signal is at a spatial resolution equal to the resolution of the binary input image yet suitable for printing by the electronic printing system.

7. The method of claim 6, further comprising the step of converting the multi-bit output signal into a pulse-width modulated signal suitable for driving the electronic printing system.

8. The method of claim 6, further comprising the step of converting the multi-bit output signal into an amplitude modulated signal suitable for driving the electronic printing system.

9. A method for improving the appearance of a binary input image to be printed by an electronic printing system, the binary input image containing a half-bitted region therein, comprising the steps of:

storing a portion of the binary input image in scanline buffer memory;

identifying the region of half-bitted image pixels within the binary input image by comparing the binary states of image pixels stored in the scanline buffer memory to a plurality of predetermined templates, wherein the templates represent binary bitmap patterns characteristically found in half-bitted regions of an image;

identifying for each match between the stored image pixel states and a predetermined template, the stored pixel corresponding to the target pixel of the template as a half-bitted image pixel;

generating a plurality of multi-bit digital signals to represent image pixels within the half-bitted region; and converting each multi-bit digital signal into a resolution enhanced output pixel suitable for printing by the electronic printing system.

10. The method of claim 9, wherein the step of generating a plurality of multi-bit digital signals comprises the step of assigning to the half-bitted image pixel a multi-bit intermediate value as a function of the template by which it was identified.

11. The method of claim 10, wherein the step of converting each multi-bit digital signal into a resolution enhanced output pixel comprises the steps of generating a plurality of binary output pixels, in response to the multi-bit intermediate value, where the binary output pixels are at a resolution greater than the resolution of the binary input image.

12. The method of claim 11, wherein the step of generating a plurality of binary output pixels comprises the steps of:

accessing a memory location within a look-up table at a location determined as a function of the multi-bit intermediate value; and reading from the memory location a plurality of binary values, each of the binary values representing the state of a corresponding binary output pixel.

13. The method of claim 9, further comprising the step of printing the resolution enhanced output pixel at a resolution greater than the resolution of the binary input image.

14. An apparatus for accurately rendering half-bitted pixels upon increasing the resolution of a binary input image to be printed by an electronic printing system, including:

scanline buffer memory for storing a portion of the binary input image;

target pixel selection means, operating on the stored portion of the binary input image, for selecting a central pixel within the binary input image;

template matching means for comparing the binary pixel state of the central pixel and a plurality of pixels neighboring the central pixel to a predetermined template pattern to identify an occurrence of a half-bitted central pixel, so as to determine a unique multi-bit digital signal which represents a desired output density for the central pixel; and a video signal generator for converting the multi-bit digital signal into at least one output pixel suitable for printing by the electronic printing system wherein the resolution enhanced output pixel will not result in a half-bitted output when printed by the electronic printing system.

15. The apparatus of claim 14, wherein said template matching means comprises an application specific integrated circuit.

16. The apparatus of claim 14, wherein said video signal generator comprises a look-up table, and where the multi-bit digital signal is an index value into the look-up table, so that the output pixel is a function of a value stored in said look-up table at the location corresponding to the index value.

17. The apparatus of claim 16, wherein said the value stored in the look-up table is a random access memory to which the values may be downloaded.

* * * * *